(12) United States Patent
Jiang et al.

(10) Patent No.: US 10,053,091 B2
(45) Date of Patent: Aug. 21, 2018

(54) SPRING SYSTEM-BASED CHANGE LANE APPROACH FOR AUTONOMOUS VEHICLES

(71) Applicant: Baidu USA LLC, Sunnyvale, CA (US)

(72) Inventors: Yifei Jiang, Sunnyvale, CA (US); Jiaming Tao, Sunnyvale, CA (US); Dong Li, Sunnyvale, CA (US); Jiangtao Hu, Sunnyvale, CA (US); Liyun Li, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 16 days.

(21) Appl. No.: 15/334,152

(22) Filed: Oct. 25, 2016

(65) Prior Publication Data
US 2018/0111612 A1 Apr. 26, 2018

(51) Int. Cl.
| | |
|---|---|
| *B60W 30/095* | (2012.01) |
| *B60W 10/04* | (2006.01) |
| *B60W 10/18* | (2012.01) |
| *B60W 10/20* | (2006.01) |
| *B60W 30/18* | (2012.01) |
| *G05D 1/00* | (2006.01) |
| *G05D 1/02* | (2006.01) |
| *G08G 1/16* | (2006.01) |
| *B60W 50/14* | (2012.01) |

(52) U.S. Cl.
CPC ........ *B60W 30/0956* (2013.01); *B60W 10/04* (2013.01); *B60W 10/18* (2013.01); *B60W 10/20* (2013.01); *B60W 30/18163* (2013.01); *B60W 50/14* (2013.01); *G05D 1/0088* (2013.01); *G05D 1/0219* (2013.01); *G05D 1/0238* (2013.01); *G08G 1/167* (2013.01); *B60W 2050/146* (2013.01); *B60W 2420/42* (2013.01); *B60W 2420/52* (2013.01); *B60W 2750/30* (2013.01)

(58) Field of Classification Search
CPC .. B60W 30/0956; B60W 10/04; B60W 10/18; B60W 10/20; B60W 30/18163; B60W 50/14; G05D 1/0088; G05D 1/0219; G05D 1/0238
USPC .......................................................... 701/25
See application file for complete search history.

(56) References Cited

U.S. PATENT DOCUMENTS

| | | | |
|---|---|---|---|
| 2004/0090319 A1* | 5/2004 | Kimura | B60T 7/22 340/435 |
| 2011/0137487 A1* | 6/2011 | Nishimaki | B60T 7/22 701/1 |

* cited by examiner

*Primary Examiner* — Yazan A Soofi
(74) *Attorney, Agent, or Firm* — Womble Bond Dickinson (US) LLP

(57) ABSTRACT

In one embodiment, in response to a request for changing lane, one or more objects surrounding an autonomous vehicle are perceived. For each of the perceived objects, a virtual spring is assigned to connect the object and the autonomous vehicle. Each virtual spring is associated with a specific spring model to generate a force based on relative positions of an associated object and the autonomous vehicle. One or more forces generated from one or more virtual springs corresponding to the one or more surrounding objects are aggregated to generate an aggregated force. One or more lane-changing parameters for the autonomous vehicle are determined based on the aggregated force and a direction of the aggregated force.

24 Claims, 10 Drawing Sheets

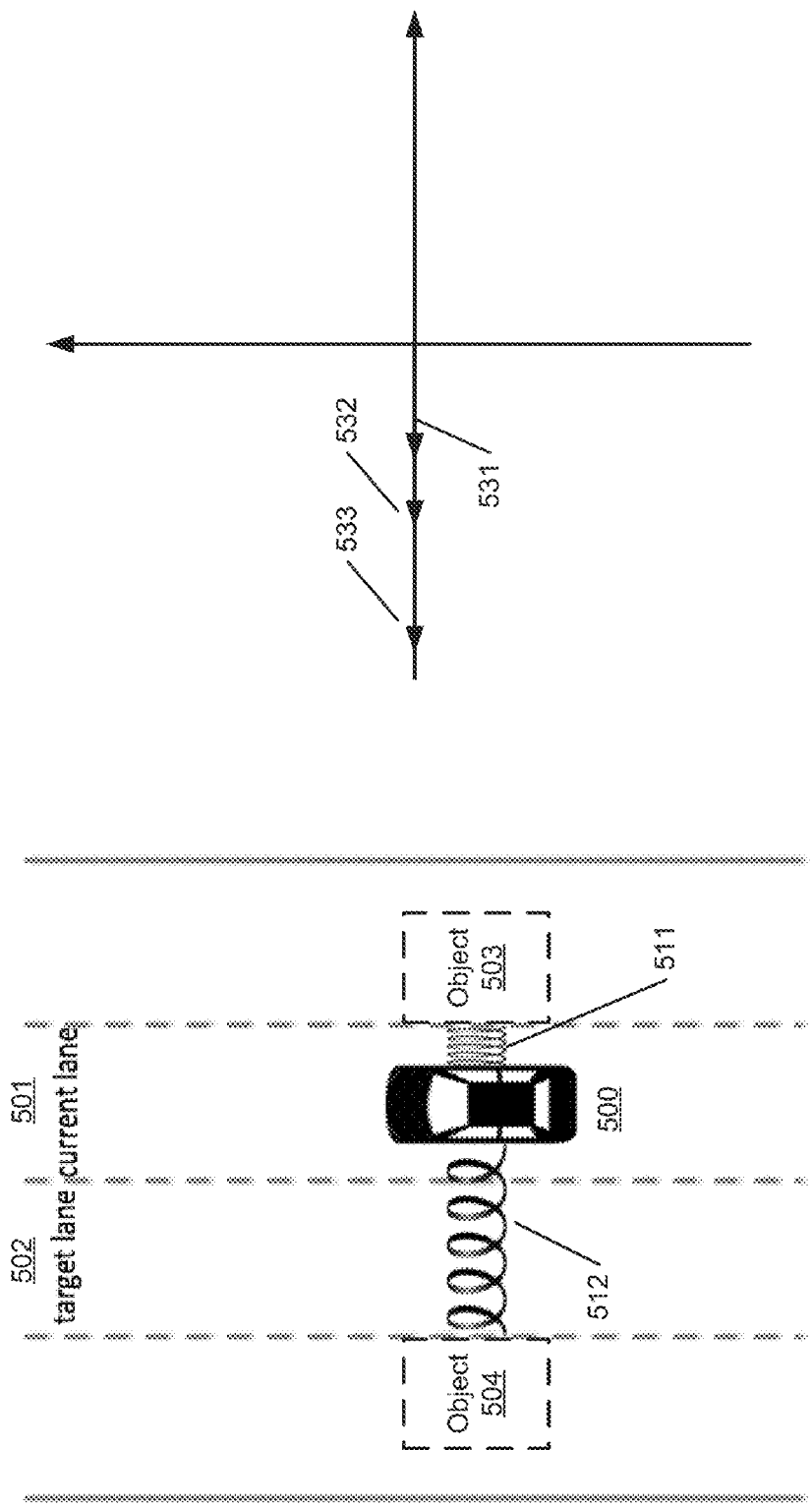

SPRING SYSTEM-BASED CHANGE LANE APPROACH FOR AUTONOMOUS VEHICLES

TECHNICAL FIELD

Embodiments of the present invention relate generally to operating autonomous vehicles. More particularly, embodiments of the invention relate to changing lanes using a spring-based system.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Changing lane is a fundamental function of an autonomous vehicle (also referred to as an autonomous driving vehicle or ADV) to avoid obstacles and to improve a trip time-efficiency. However, making the lane-changing safe and efficient is a difficult task because instead of computing the driving conditions of a current lane, an autonomous vehicle needs to consider the driving conditions of both the current lane and a target lane. In addition, a transition path between the current lane and the target lane is unknown and dynamically changing, which adds the complexity of decision making. Further, the state of lane-changing needs to be determined continuously during the process, which requires a high accuracy of localization and complex logic between states.

BRIEF DESCRIPTION OF THE DRAWINGS

Embodiments of the invention are illustrated by way of example and not limitation in the figures of the accompanying drawings in which like references indicate similar elements.

FIGS. 5A and 5B are diagram illustrating a lane changing scenario modeled by a virtual spring according to one embodiment of the invention.

DETAILED DESCRIPTION

Figure 1:
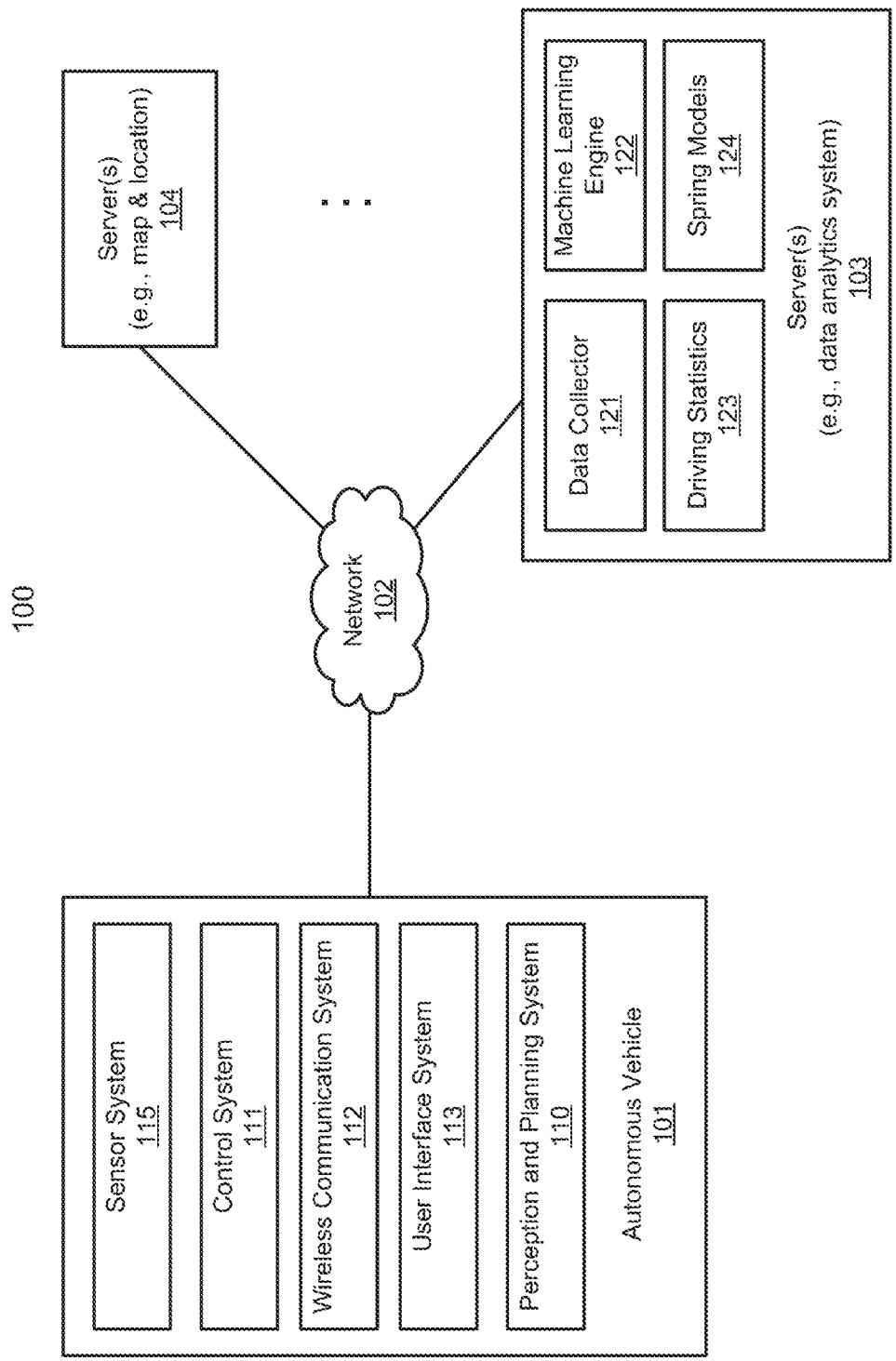
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a spring-based lane-changing system is utilized to decide when and how a lane-changing transition should be made if a change lane activity is planned. When a decision is made to change from a current lane to a target lane, the spring-based lane-changing system is invoked to apply a virtual spring model to each of the objects (e.g., a vehicle, an obstacle, a pedestrian, a current lane, a target lane, an adjacent lane) that may affect the lane-changing of the autonomous vehicle. A virtual spring model is utilized to determine a potential impact from an object when the autonomous vehicle changes from the current lane to the target lane. The impact of a virtual spring may be represented by a force generated by the virtual spring in view of the Hooke's law. Based on the outcomes (e.g., forces) of the virtual springs associated with the objects surrounding the autonomous vehicle, a decision can be made regarding whether the autonomous should change lane and if so, how to change lane at the point in time.

In one embodiment, in response to a request for changing lane, one or more objects surrounding an autonomous vehicle are perceived and identified. For each of the objects, a virtual spring is assigned to the object. The virtual spring connects the object with the autonomous vehicle. The virtual spring is associated with a spring model (also referred to as a virtual spring model) that generates a force based on a relative position between the autonomous vehicle and the object. The forces (e.g., force vectors) generated from the virtual springs associated with the objects are aggregated to generate an aggregated force (e.g., an aggregated vector). The lane-changing parameters for the autonomous vehicle are determined based on the aggregated force. A lane-changing parameter refers to a speed of lane changing, an angle of lane changing (e.g., angle entering a target lane), or a distance to complete lane changing from a current lane to a target lane, etc. In one embodiment, a direction of an aggregated force is utilized to determine whether the autonomous vehicle should change lane. The magnitude and the direction of the aggregated force can be utilized to determine how the autonomous vehicle changes lane (e.g., a speed, turning angle, distance required to change lane).

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
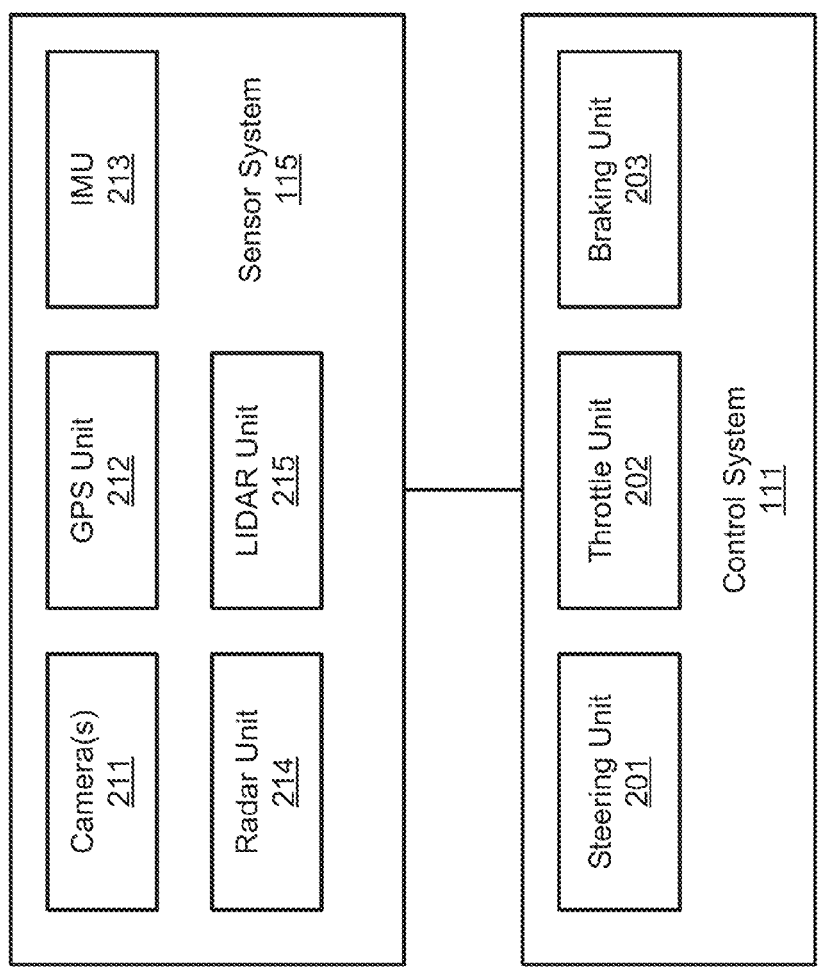
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

According to one embodiment, when autonomous vehicle 101 decides to change lane from a current lane to a target lane, perception and planning system 110 perceives one or more objects that potentially impact the lane changing of autonomous vehicle 101. An object can be a vehicle, a pedestrian, an obstacle (e.g., a parked vehicle or bike, a construction block), a current lane, a target lane, or an adjacent lane, etc. For each of the objects, a virtual spring is allocated and assigned to the object. Each virtual spring connects autonomous vehicle 101 and the corresponding object. A force is calculated for each of the virtual spring based on a set of rules or parameters configured or modeled based on the Hooke's law. The forces of the virtual springs are then aggregated to generate an aggregated force. The aggregated force is utilized to determine whether autonomous vehicle 101 should change lane (e.g., safely) and if so, how to change lane.

In one embodiment, a virtual spring is associated or configured with a set of spring parameters or a spring model. The spring parameters (e.g., a strength coefficient, an initial length) may be configured based on a relationship between autonomous vehicle 101 and the object, such as, for example, a relative position between autonomous vehicle 101 and the object. The spring parameters, rules, or spring models concerning the virtual springs may be configured offline by a data analytics system based on a large amount of driving statistics, such as, for example data analytics system or server 103.

In one embodiment, data analytics system 103 includes data collector 121 and machine-learning engine 122. Data collector 121 collects driving statistics 123 from a variety of vehicles. Driving statistics 123 may include information concerning how a typical vehicle would do when changing lane in the same or similar driving environment. For example, when a vehicle attempts to change lane from a current lane to a target lane and there is another vehicle in the target lane, how the vehicle did. Did the vehicle overtake or yield in view of the relative position between the vehicle and the other vehicle. Machine learning engine 122 analyzes driving statistics 123 to learn and create a number of virtual spring models or rules 124 for a number of different driving scenarios of lane changing. Spring models or rules 124. The spring models or rules 124 can then be uploaded onto data processing system 110 of autonomous vehicle 101 to be utilized for online decisions of lane changing.

Figure 3:
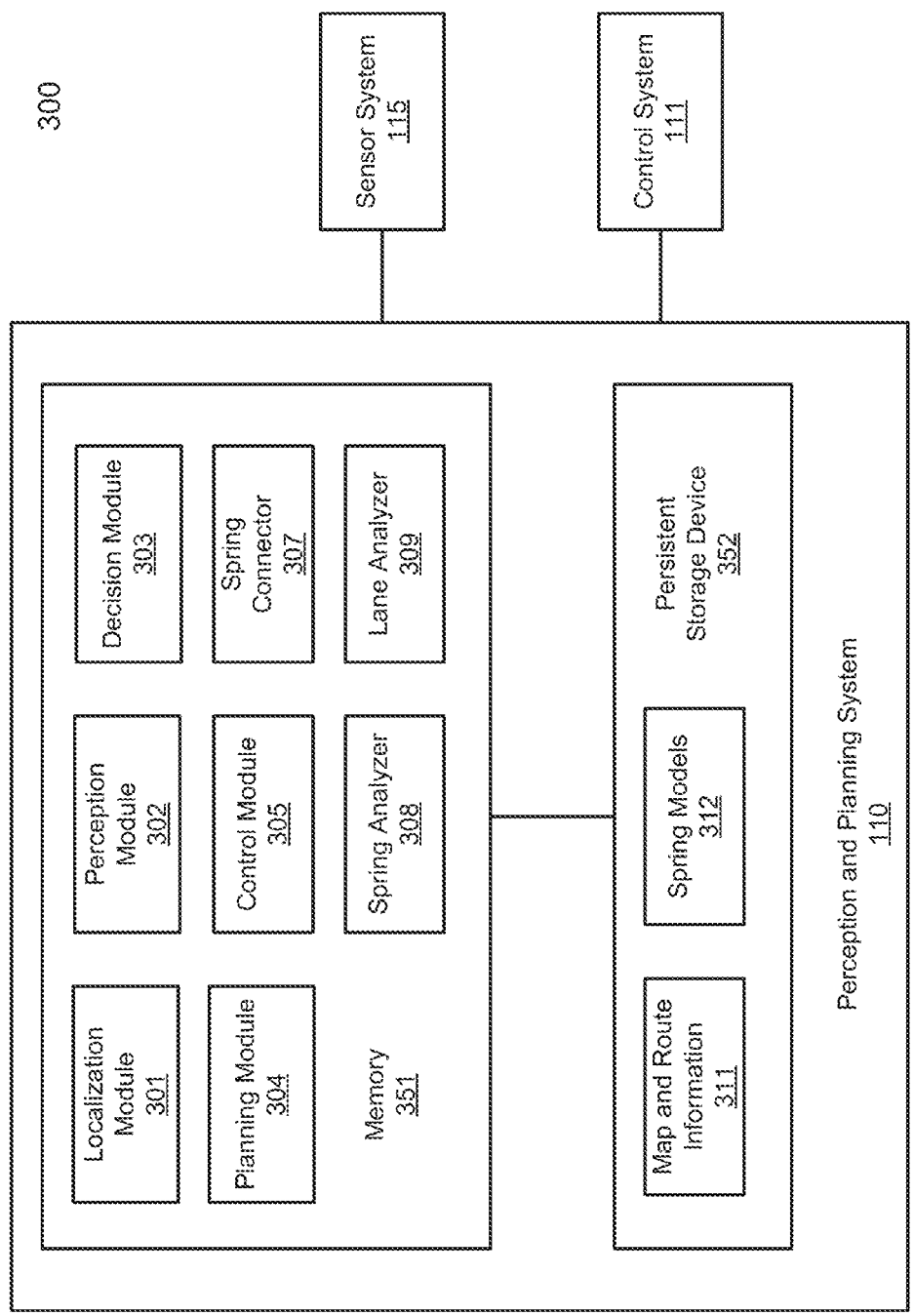
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, spring connector 307, spring analyzer 308, and lane analyzer 309.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, for each of the objects perceived, the system determines whether the object may potentially affect the lane changing of the autonomous vehicle from a current lane to a target lane. For example, if another vehicle is within a predetermined proximity of the autonomous vehicle, either in the current lane or the target lane, that vehicle may be considered affecting lane changing of the autonomous vehicle. If a vehicle is not in the current lane or the target lane, but that vehicle may enter the current lane or target lane based on the predicted trajectory of the vehicle, that vehicle may also affect the lane changing of the autonomous vehicle.

In one embodiment, for each of the objects that may affect the lane changing of autonomous vehicle 300, spring connector 307 allocates and assigns a virtual spring to connect autonomous vehicle 300 with the object. For each of the virtual springs, spring analyzer 308 analyzes the relationship between autonomous vehicle 300 and the object to determine a set of spring parameters. For example, spring analyzer 308 determines a relative position between autonomous vehicle 300 and the object. Based on the relative position between the autonomous vehicle and the object, spring analyzer 308 determines an initial length ($X_0$) of the virtual spring and a strength coefficient (K) of the virtual spring. K is may be a constant representing characteristics (e.g., stiffness) of the virtual spring. Alternatively, spring analyzer 308 can apply a predetermined spring model (as a part of spring models 312) to the virtual spring to determine such spring parameters. In another embodiment, spring analyzer 308 may perform a lookup operation in a database or a lookup table (not shown) to obtain the spring parameters based on the relationship between the autonomous vehicle and the object. The spring models 312 and/or the lookup table may be constructed by a data analytics system or server offline such as data analytics server 103.

According to the Hooke's law, a force (F) needed to extend or compress a spring by a distance $\Delta X$ is proportional to that distance $\Delta X$, where $\Delta X = X - X_0$. Distance X represents a current distance between the autonomous vehicle and an object associated with spring. The force (F) resulted from the relative position between the autonomous vehicle and the object is represented by a force vector with a magnitude and a direction. The force can be positive or negative dependent upon the distance between the autonomous vehicle and the object in view of the initial length of the spring. The force can be utilized to determine whether the autonomous vehicle should move towards to the object or move away from the object and if so, how to move.

Figure 4:
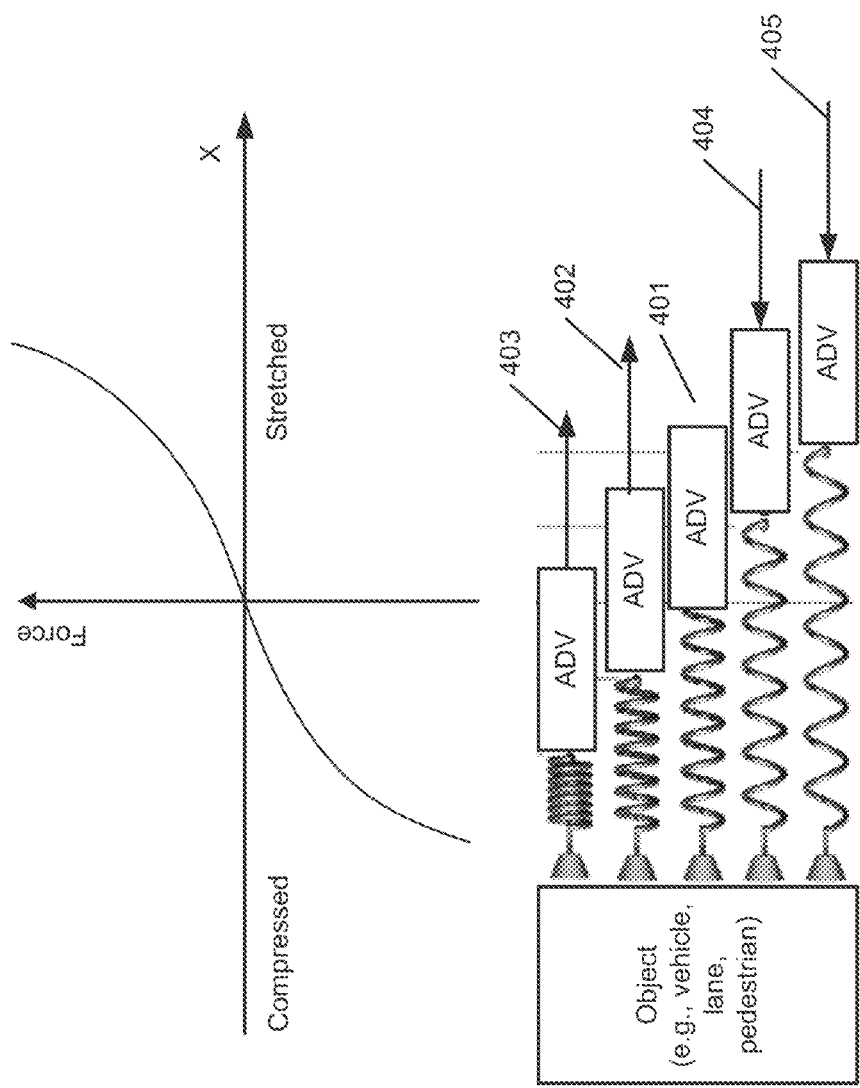
FIG. 4 is a diagram illustrating a virtual spring model according to one embodiment of the invention.

Referring now to FIG. 4, in this example, at position 401, the spring is at an initial or "relaxed" position and the length of the spring is referred to as an initial length (e.g., without being compressed or stretched). With the initial position there is no force generated from the spring. At positions 402-403, the spring is compressed as the length of the spring is shorted than the initial length, in which the autonomous driving vehicle or ADV is closer to the object compared to position 401. As a result, a force is generated from the compressed spring pushing the ADV away from the object. When the spring is compressed harder at position 403 as the ADV is closer to the object, a bigger force is generated. At positions 404-405, the spring is stretched as the length of the spring is longer than the initial length, in which the ADV is farther away from the object. As a result, a force is generated pulling the ADV towards the object.

In one embodiment, by analyzing the force generated by a virtual spring connecting an ADV with an object, the ADV can determine whether the ADV should move towards to the object or move away from the object. In the lane changing scenario, the object can represent a target lane or another vehicle in the target lane. At positions 402-403, since the force pushes the ADV away from the object, the force may indicate that the ADV should not move towards to the object (e.g., changing lane). On the other hand, at positions 404-

405, since the force pulls the ADV towards the object, the force may indicate that the ADV can move towards the object.

Referring back to FIG. 3, in reality, there may be more than one object in a driving environment. Each of the objects is assigned with a virtual spring. Each virtual spring will generate a force with a particular direction and magnitude dependent upon a relative position between the corresponding object and the autonomous vehicle. In one embodiment, lane analyzer 309 analyzes the forces generated by all virtual springs and aggregates the forces into an aggregated force. The aggregated force is then utilized to determine whether the vehicle should change lane and if so, how to change lane (e.g., turning angle, speed, or distance). For example, a direction of the aggregated force can be utilized to determine whether the vehicle should change lane. The direction and a magnitude of the aggregated force can be utilized to determine how to change lane. The decision or recommendation by lane analyzer can be used by decision module 304 to make a final decision of lane changing. Thereafter, planning module 305 plans a route or path of changing lane based on a decision by decision module 304. Control module 306 then issues proper control commands accordingly to control and drive the vehicle.

FIGS. 5A and 5B are diagrams illustrating certain driving scenarios according to certain embodiments of the invention. Referring to FIG. 5A, in this example, autonomous vehicle 500 is driving in current lane 501 and decides to change lane from current lane 501 to target lane 502. In response to the request for changing lane, virtual spring 511 is allocated to connect ADV 500 and object 503, where object 503 represents currently lane 501. In addition, virtual spring 512 is allocated to connect ADV 500 and object 504, where object 504 represents target lane 502. In one embodiment, object 503 is positioned on a far side of current lane 501 with respect to target lane 502 and object 504 is positioned on a far side of target lane 502 with respect to current lane 501. The spring parameters such as the initial lengths and strength coefficients of virtual springs 511-512 are configured based on the relationship between ADV 500 and objects 503-504.

As described above, such parameters may be dynamically determined based on the lane configuration at the point in time (e.g., lane width). Alternatively, such parameters can be determined by performing a lookup operation in a mapping table or database that maps a particular lane configuration to a set of spring parameters. Furthermore, such parameters can also be determined by applying a spring model associated with the lane configuration at the point in time. The spring parameters of the mapping tables/databases or spring models may be determined and created based on a large amount of driving statistics of a variety of vehicles in a similar driving environment or driving scenario by a data analytics system offline (e.g., data analytics system 103).

In one embodiment, virtual springs 511-512 may provide a force according to the Hooke's law based on their spring parameters (e.g., strength coefficients and initial lengths). The direction and the magnitude of the force of each of virtual springs 511-512 may be utilized to determine whether ADV 500 should change lane and how to change lane. In this example, it is assumed there is no other vehicle around that potentially affects the lane changing of ADV 500 (e.g., not within a predetermined proximity). It is also assumed that virtual spring 511 associated with current lane 501 is compressed (e.g., shorter than the initial length), since ADV 500 is positioned within current lane 501. Virtual spring 512 associated with target lane 502 is stretched (e.g., longer than the initial length).

As a result, based on the Hooke's law, a force generated by virtual spring 511 would push ADV 500 from right to left towards target lane 502 and a force generated by virtual spring 512 would pull ADV from right to left towards target lane 502. An aggregated force is generated based on the force generated from virtual spring 511 and the force generated from virtual spring 512 as shown in FIG. 5B. Referring now to FIG. 5B, individual force 531 is generated by spring 511 and individual force 532 is generated by spring 512. Aggregated force 533 is calculated based on forces 531-532, in this example, by simply adding forces 531-532 together since they have the same direction. Therefore, based on the aggregated associated with virtual springs 511-512, in this example pointing from right to left, it can be determined that ADV 500 can change lane with any angles.

As more surrounding objects or vehicles are located within the driving area of ADV 500, more virtual springs are allocated. More forces are generated and the aggregated force and its direction may change as a result, which may affect the decision of lane changing of an ADV. Referring now to FIG. 6A, in this example, in addition to objects 502-503 representing current lane 501 and target lane 502, there is another vehicle 505 ahead of ADV 500. Accordingly, virtual spring 513 is allocated to connect ADV 500 and vehicle 505. The spring parameters such as strength coefficient and initial length are configured based on the relationship between vehicle 505 and ADV 500 (e.g., ahead vehicle configuration).

Dependent upon the distance between vehicle 505 and ADV 500, spring 513 may be in a compressed shape or a stretched shape. As a result, a force generated from spring 513 may be pulling ADV 500 towards vehicle 505 (if spring 513 is stretched) or pushing ADV 500 away from vehicle 505 (if spring 513 is compressed). All forces generated from springs 511-513 are aggregated to determine an aggregated force and its direction. The aggregated force and its direction are utilized to determine whether ADV 500 should change lane at the point in time and if so, how to change lane (e.g., speed, angle). For example, dependent upon the final magnitude of the aggregated force and its direction, ADV 500 can change from current lane 501 to target lane 502 via path 521 or path 522. If the distance between vehicle 505 and ADV 500 is relative large (e.g., spring 513 stretched farther), ADV 500 may want to change lane via path 521. If the distance between vehicle 505 and ADV 500 is relative small (e.g., spring 513 stretched shorter, but is still stretched), ADV 500 may want to change lane via path 522 to avoid colliding vehicle 505.

Figure 6B:
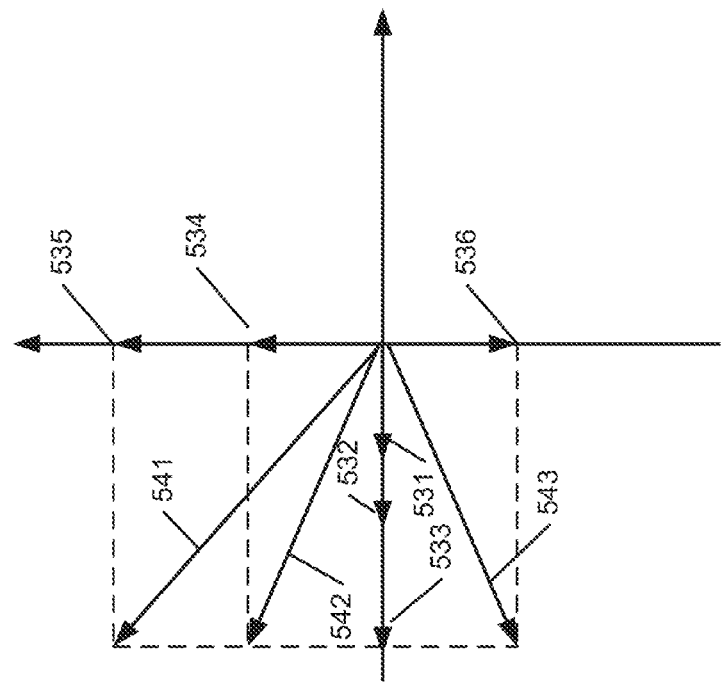
FIGS. 6A and 6B are diagram illustrating a lane changing scenario modeled by a virtual spring according to another embodiment of the invention.
Figure 6A:
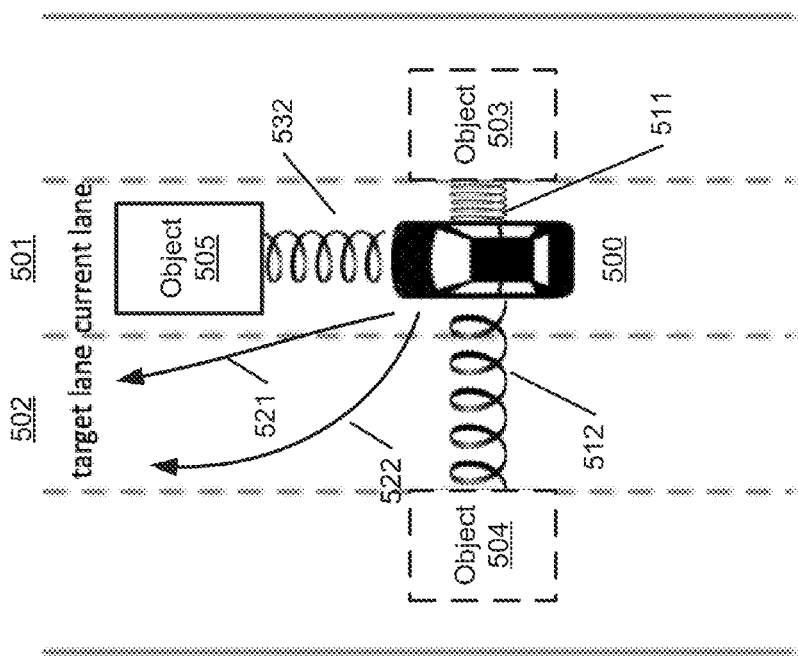

Referring now to FIG. 6B, different magnitudes and directions of the force generated from spring 513 may affect the decision of whether to change lane and how to change lane for ADV 500. Assuming spring 513 is stretched in a smaller stretched shape (e.g., vehicle 505 is closer to ADV 500), force 534 is generated. By aggregating forces 531-532 and 534, aggregated force 542 is determined, which may be used to determine path 522. On the other hand, if spring 513 is stretched in a larger stretched shape (e.g., ADV 500 is farther away from vehicle 505), force 535 is generated and aggregated force 541 is calculated, which may be used to determine path 521. However, if spring 513 is compressed (e.g., ADV 500 and vehicle 505 is too close to each other), force 536 is generated from spring 513 and aggregated force 543 is calculated, which indicates that ADV 500 should not change lane at the point in time.

Figure 7B:
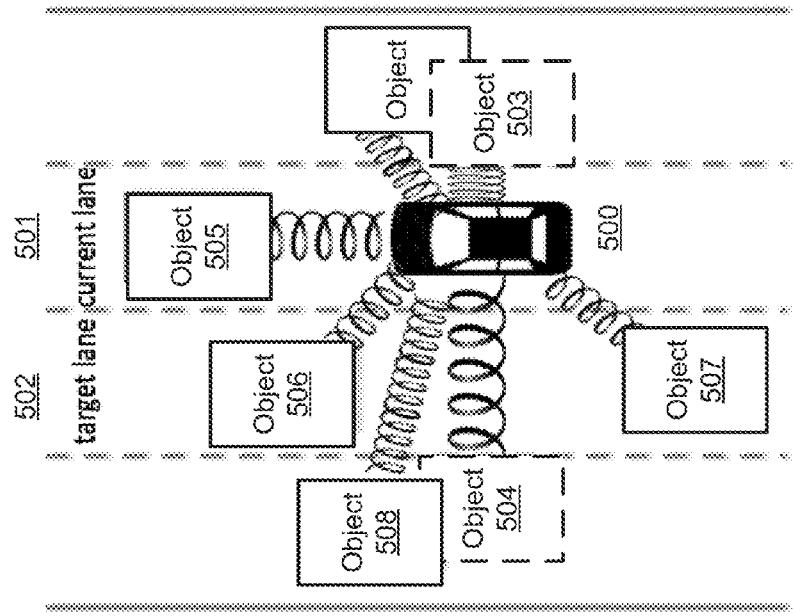
FIGS. 7A and 7B are diagram illustrating a lane changing scenario modeled by a virtual spring according to certain embodiments of the invention.
Figure 7A:
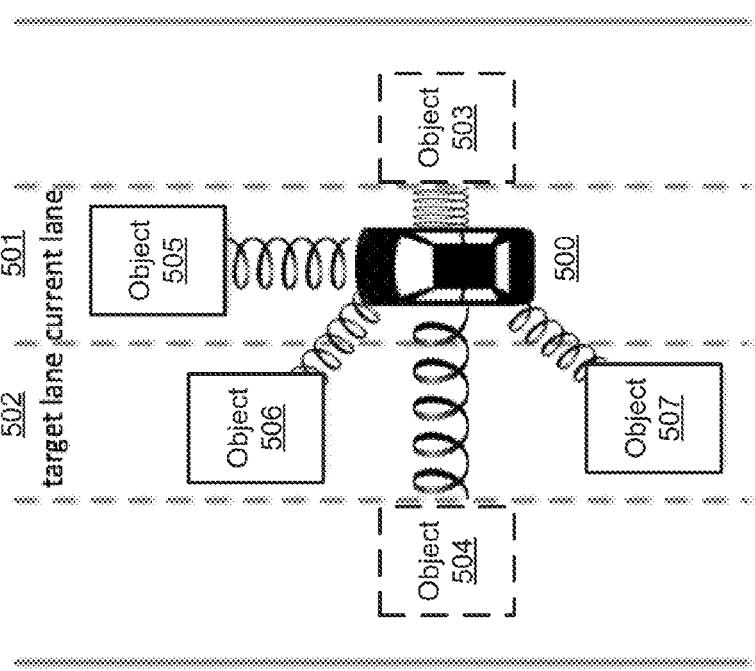

FIGS. 7A and 7B show some other scenarios and the techniques described above can be applied to determine whether ADV 500 should change lane and if so, how to change lane. Referring to FIG. 7A, in this example, additional vehicles 506-507 on target lane 502 may affect the decision of whether ADV 500 should and/or how to change lane based on their corresponding virtual springs. Referring to FIG. 7B, in this example, although vehicle 508 is not moving within target lane 502, ADV 500 may determine or predict that the trajectory of vehicle 508 may change lane and enter target lane 502. As a result, an additional virtual spring is allocated to connect ADV 500 with vehicle 508, which may also affect the lane changing decision of ADV 500.

Figure 8:
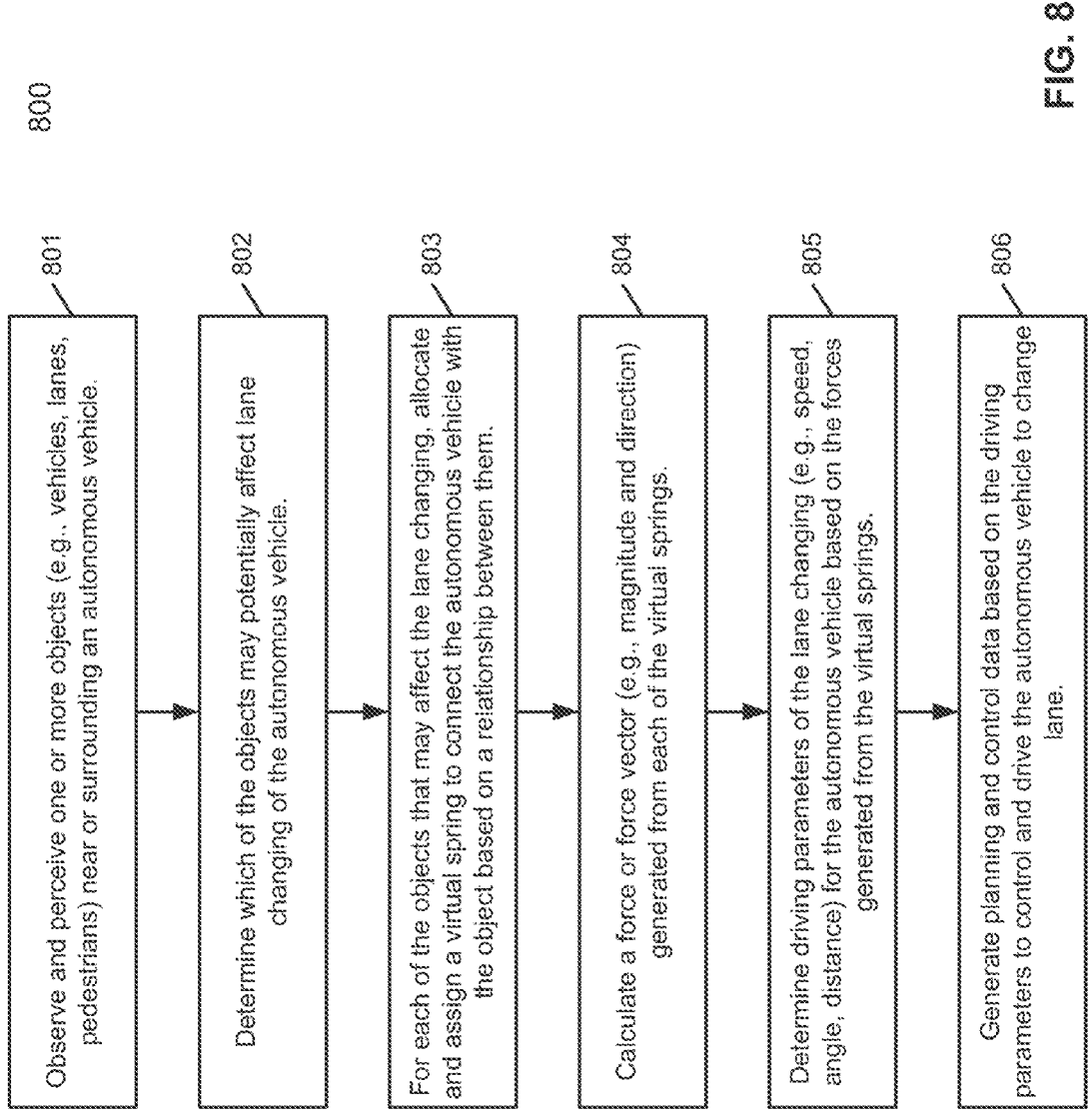
FIG. 8 is a flow diagram illustrating a process of operating an autonomous vehicle according to one embodiment of the invention.

FIG. 8 is a flow diagram illustrating a process of operating an autonomous vehicle according to one embodiment of the invention. Process 800 may be performed by processing logic which may include software, hardware, or a combination thereof. For example, process 800 may be performed by a data processing system performing planning and control of an autonomous vehicle, such as perception and planning system 110. Referring to FIG. 8, at block 801, processing logic observes and perceives one or more objects (e.g., vehicles, lanes, pedestrians) near or surrounding an autonomous vehicle. At block 802, processing logic determine which of the objects will affect lane changing of the autonomous vehicle. For each of the objects that may affect the lane changing of the autonomous vehicle, at block 803, processing logic allocates a virtual spring to connect the autonomous vehicle and the object based on a relationship (e.g., relative position) between the autonomous vehicle and the object. At block 804, processing logic calculates a force vector (e.g., a magnitude and direction of the force) generated from each of the virtual springs using a formula or spring model corresponding to the virtual spring. All forces of all virtual springs are aggregated to generate an aggregated force vector. At block 805, driving parameters for lane changing are determined based on the aggregated force vector, which may include a speed, an angle to enter the target lane, and/or a distance to complete the lane changing, etc. At block 806, planning and control data for lane changing is generated based on the driving parameters to control and drive the autonomous vehicle to change lane.

Figure 9:
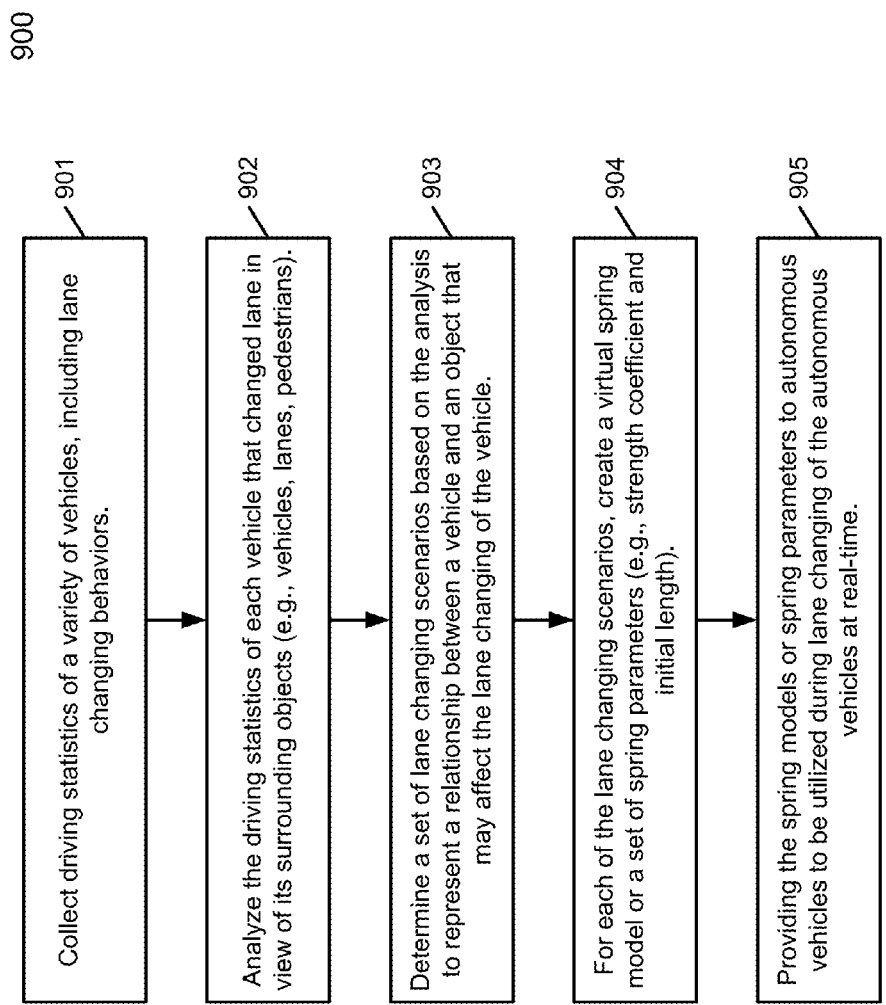
FIG. 9 is a flow diagram illustrating a process of creating spring models for operating autonomous vehicles according to one embodiment of the invention.

FIG. 9 is a flow diagram illustrating a process of creating spring models for operating autonomous vehicles according to one embodiment of the invention. Process 900 may be performed by processing logic which may include software, hardware, or a combination thereof. For example, process 900 may be performed by a data analytics system such as data analytics system 103 of FIG. 1. Referring to FIG. 9, at block 901, processing logic collects driving statistics of a variety of vehicles, including lane changing behaviors of the vehicles. At block 902, processing logic analyzes the driving statistics of each vehicle that changed lane in view of the surrounding objects (e.g., vehicles and lane configuration) at the point in time. At block 903, processing logic determines a number of lane changing scenarios based on the analysis. Each lane changing scenario may further define a proximity or driving area surrounding the autonomous vehicle in question. If an object is located within the proximity or the driving area, it may be considered affecting the lane changing of the autonomous vehicle. For each of the lane changing scenarios, at block 904, processing logic creates a virtual spring model (or formula to calculate spring parameters, or a set of predefined spring parameters such as the strength coefficient and initial length). At block 905, the virtual spring models are provided to autonomous vehicles to be utilized during the online lane changing of the autonomous vehicles.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
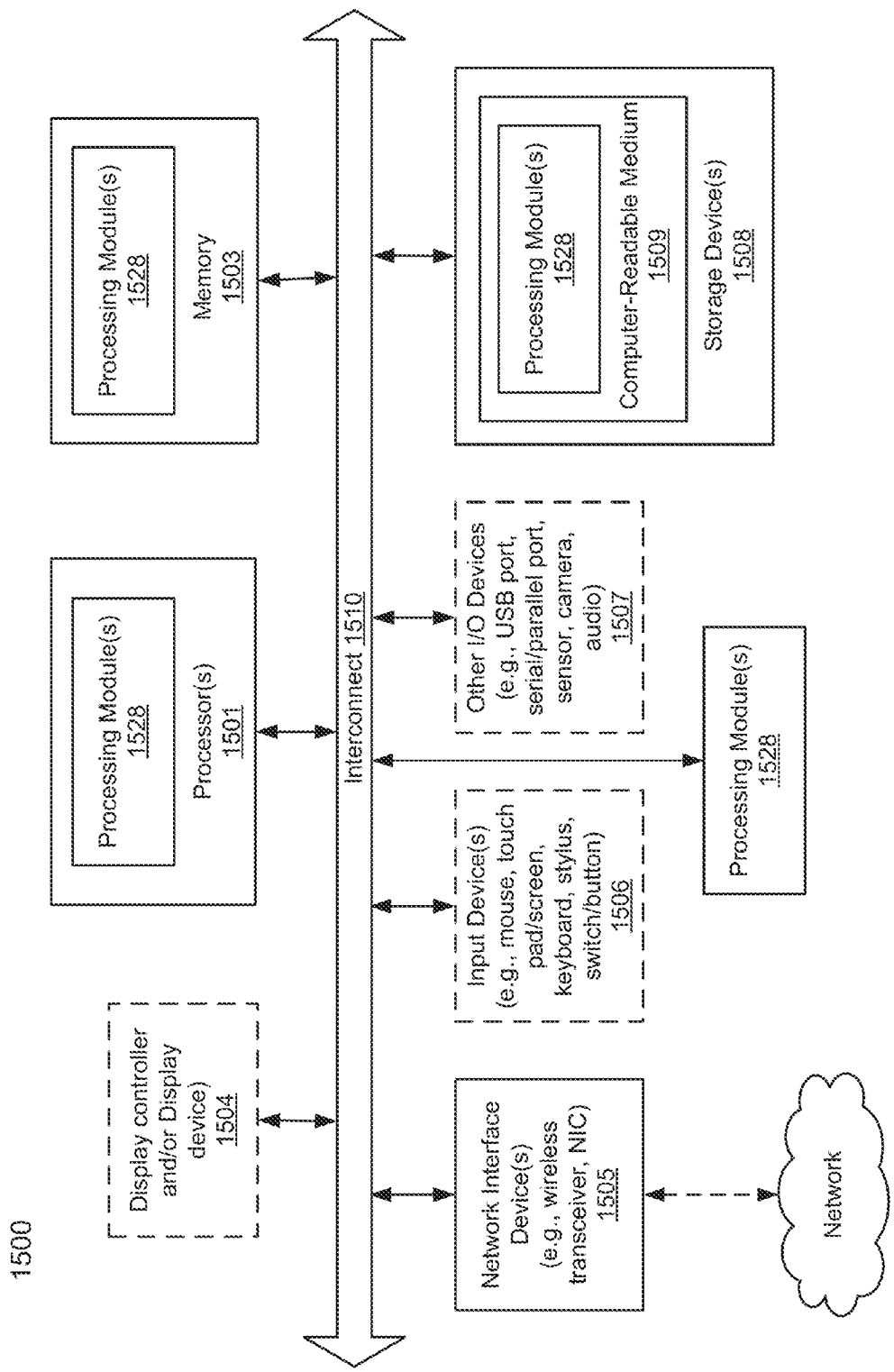
FIG. 10 is a block diagram illustrating a data processing system according to one embodiment.

FIG. 10 is a block diagram illustrating an example of a data processing system which may be used with one embodiment of the invention. For example, system 1500 may represent any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, machine learning engine 122, spring connector 307, spring analyzer 308, or lane analyzer 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
   in response to a request for changing lane, perceiving one or more objects surrounding an autonomous vehicle;
   for each of the perceived objects, assigning, by a spring analyzer executed by a processor, a virtual spring connecting the object and the autonomous vehicle, wherein each virtual spring is associated with a specific spring model to generate a force based on relative positions of an associated object and the autonomous vehicle;
   aggregating, by a lane analyzer executed by the processor, one or more forces generated from one or more virtual springs corresponding to the one or more surrounding objects to generate an aggregated force;
   determining one or more lane-changing parameters for the autonomous vehicle based on the aggregated force and a direction of the aggregated force, including determining a turning angle of changing lane based on the direction of the aggregated force; and
   controlling by a control module the autonomous vehicle to change lane from a first lane to a second lane based on the one or more lane-changing parameters.

2. The method of claim 1, wherein each virtual spring is modeled based on a strength coefficient and a distance between the autonomous vehicle and a corresponding object relative to an initial length of the virtual spring.

3. The method of claim 2, wherein the strength coefficient and the initial length of a virtual spring are determined based on relative positions of the autonomous vehicle and the corresponding object.

4. The method of claim 1, further comprising determining which of the surrounding objects will affect lane changing of the autonomous vehicle, wherein a virtual spring is connected between the autonomous vehicle and an object only if the object potentially affects the lane changing of the autonomous vehicle.

5. The method of claim 1, wherein a direction and a magnitude of the aggregated force are utilized to determine whether the autonomous vehicle should change lane at a point in time.

6. The method of claim 1, wherein a magnitude of the aggregated force is utilized to determine a speed of the lane changing.

7. The method of claim 1, wherein assigning a virtual spring comprises:
   assigning a first virtual spring to connect the autonomous vehicle with a current lane from which the autonomous vehicle is changing lane, the first virtual spring being associated with a first spring model; and
   assigning a second virtual spring to connect the autonomous vehicle with a target lane to which the autonomous vehicle is changing lane, the second virtual spring being associated with a second spring model, wherein the lane-changing parameters are determined based on a first force derived from the first spring model and a second force derived from the second spring model.

8. The method of claim 1, wherein assigning a virtual spring comprises:

assigning a first virtual spring to connect the autonomous vehicle with a first vehicle moving in a current lane from which the autonomous vehicle is changing lane, the first virtual spring being associated with a first spring model; and assigning a second virtual spring to connect the autonomous vehicle with a second vehicle moving in a target lane to which the autonomous vehicle is changing lane, the second virtual spring being associated with a second spring model, wherein the lane-changing parameters are determined based on a first force derived from the first spring model and a second force derived from the second spring model.

9. A non-transitory machine-readable medium having instructions stored therein, which when executed by a processor, cause the processor to perform operations of operating an autonomous vehicle, the operations comprising:
in response to a request for changing lane, perceiving one or more objects surrounding an autonomous vehicle;
for each of the perceived objects, assigning a virtual spring connecting the object and the autonomous vehicle, wherein each virtual spring is associated with a specific spring model to generate a force based on relative positions of an associated object and the autonomous vehicle;
aggregating one or more forces generated from one or more virtual springs corresponding to the one or more surrounding objects to generate an aggregated force;
determining one or more lane-changing parameters for the autonomous vehicle based on the aggregated force and a direction of the aggregated force, including determining a turning angle of changing lane based on the direction of the aggregated force; and
controlling the autonomous vehicle to change lane from a first lane to a second lane based on the one or more lane-changing parameters.

10. The machine-readable medium of claim 9, wherein each virtual spring is modeled based on a strength coefficient and a distance between the autonomous vehicle and a corresponding object relative to an initial length of the virtual spring.

11. The machine-readable medium of claim 10, wherein the strength coefficient and the initial length of a virtual spring are determined based on relative positions of the autonomous vehicle and the corresponding object.

12. The machine-readable medium of claim 9, wherein the operations further comprise determining which of the surrounding objects will affect lane changing of the autonomous vehicle, wherein a virtual spring is connected between the autonomous vehicle and an object only if the object potentially affects the lane changing of the autonomous vehicle.

13. The machine-readable medium of claim 9, wherein a direction and a magnitude of the aggregated force are utilized to determine whether the autonomous vehicle should change lane at a point in time.

14. The machine-readable medium of claim 9, wherein a magnitude of the aggregated force is utilized to determine a speed of the lane changing.

15. The machine-readable medium of claim 9, wherein assigning a virtual spring comprises:
assigning a first virtual spring to connect the autonomous vehicle with a current lane from which the autonomous vehicle is changing lane, the first virtual spring being associated with a first spring model; and
assigning a second virtual spring to connect the autonomous vehicle with a target lane to which the autonomous vehicle is changing lane, the second virtual spring being associated with a second spring model, wherein the lane-changing parameters are determined based on a first force derived from the first spring model and a second force derived from the second spring model.

16. The machine-readable medium of claim 9, wherein assigning a virtual spring comprises:
assigning a first virtual spring to connect the autonomous vehicle with a first vehicle moving in a current lane from which the autonomous vehicle is changing lane, the first virtual spring being associated with a first spring model; and
assigning a second virtual spring to connect the autonomous vehicle with a second vehicle moving in a target lane to which the autonomous vehicle is changing lane, the second virtual spring being associated with a second spring model, wherein the lane-changing parameters are determined based on a first force derived from the first spring model and a second force derived from the second spring model.

17. A data processing system, comprising:
a processor; and
a memory coupled to the processor to store instructions, which when executed by the processor, cause the processor to perform operations, the operations including
in response to a request for changing lane, perceiving one or more objects surrounding an autonomous vehicle;
for each of the perceived objects, assigning a virtual spring connecting the object and the autonomous vehicle, wherein each virtual spring is associated with a specific spring model to generate a force based on relative positions of an associated object and the autonomous vehicle;
aggregating one or more forces generated from one or more virtual springs corresponding to the one or more surrounding objects to generate an aggregated force;
determining one or more lane-changing parameters for the autonomous vehicle based on the aggregated force and a direction of the aggregated force, including determining a turning angle of changing lane based on the direction of the aggregated force; and
controlling the autonomous vehicle to change lane from a first lane to a second lane based on the one or more lane-changing parameters.

18. The system of claim 17, wherein each virtual spring is modeled based on a strength coefficient and a distance between the autonomous vehicle and a corresponding object relative to an initial length of the virtual spring.

19. The system of claim 18, wherein the strength coefficient and the initial length of a virtual spring are determined based on relative positions of the autonomous vehicle and the corresponding object.

20. The system of claim 17, wherein the operations further comprise determining which of the surrounding objects will affect lane changing of the autonomous vehicle, wherein a virtual spring is connected between the autonomous vehicle and an object only if the object potentially affects the lane changing of the autonomous vehicle.

21. The system of claim 17, wherein a direction and a magnitude of the aggregated force are utilized to determine whether the autonomous vehicle should change lane at a point in time.

22. The system of claim 17, wherein a magnitude of the aggregated force is utilized to determine a speed of the lane changing.

23. The system of claim 17, wherein assigning a virtual spring comprises:
- assigning a first virtual spring to connect the autonomous vehicle with a current lane from which the autonomous vehicle is changing lane, the first virtual spring being associated with a first spring model; and
- assigning a second virtual spring to connect the autonomous vehicle with a target lane to which the autonomous vehicle is changing lane, the second virtual spring being associated with a second spring model, wherein the lane-changing parameters are determined based on a first force derived from the first spring model and a second force derived from the second spring model.

24. The system of claim 17, wherein assigning a virtual spring comprises:
- assigning a first virtual spring to connect the autonomous vehicle with a first vehicle moving in a current lane from which the autonomous vehicle is changing lane, the first virtual spring being associated with a first spring model; and
- assigning a second virtual spring to connect the autonomous vehicle with a second vehicle moving in a target lane to which the autonomous vehicle is changing lane, the second virtual spring being associated with a second spring model, wherein the lane-changing parameters are determined based on a first force derived from the first spring model and a second force derived from the second spring model.

* * * * *